US009588227B2

(12) United States Patent
Monnerat et al.

(10) Patent No.: US 9,588,227 B2
(45) Date of Patent: Mar. 7, 2017

(54) METHOD FOR DETERMINING A CONFIDENCE INDICATOR RELATING TO THE TRAJECTORY FOLLOWED BY A MOVING OBJECT

(71) Applicants: THALES, Neuilly-sur-Seine (FR); CENTRE NATIONAL D'ETUDES SPATIALES (CNES), Paris (FR)

(72) Inventors: Michel Monnerat, Saint Jean (FR); Lionel Ries, Viviers les Montagnes (FR)

(73) Assignees: THALES, Courbevoie (FR); CENTRE NATIONAL D'ETUDES SPATIALES (CNES), Paris (FR)

( * ) Notice: Subject to any disclaimer, the term of this patent is extended or adjusted under 35 U.S.C. 154(b) by 1063 days.

(21) Appl. No.: 13/763,717

(22) Filed: Feb. 10, 2013

(65) Prior Publication Data
US 2013/0207837 A1 Aug. 15, 2013

(30) Foreign Application Priority Data
Feb. 10, 2012 (FR) ..................................... 12 00397

(51) Int. Cl.
*G01S 19/40* (2010.01)
*G01S 19/22* (2010.01)
(Continued)

(52) U.S. Cl.
CPC .............. *G01S 19/40* (2013.01); *G01S 19/22* (2013.01); *G01S 19/49* (2013.01); *G01S 19/50* (2013.01)

(58) Field of Classification Search
CPC ....... G07B 15/063; G01S 19/22; G01S 19/40; G01S 19/49; G01S 19/50
See application file for complete search history.

(56) References Cited

U.S. PATENT DOCUMENTS

| 5,414,729 A | 5/1995 | Fenton |
| 6,252,863 B1 * | 6/2001 | Raby ....................... G01S 19/22 370/335 |

(Continued)

FOREIGN PATENT DOCUMENTS

EP 1712930 A1 10/2006

OTHER PUBLICATIONS

M. M Foucras et al., Detailed Analysis of the Impact of the Code Doppler on the Acquisition Performance of New GNSS Signals, ION ITM 2014, International Technical Meeting of the Institute of Navigation, Jan. 2014.*

(Continued)

*Primary Examiner* — Bernarr Gregory
*Assistant Examiner* — Fred H Mull
(74) *Attorney, Agent, or Firm* — Baker Hostetler LLP

(57) ABSTRACT

A method includes estimating the position of the moving object on the basis of the reception of navigation signals emitted by a constellation of satellites, the navigation signals being modulated by a code and the receiver comprising a local replica of the code. The determination of the confidence indicator consists in estimating a speed of displacement of the receiver over an identified trajectory segment, deducing therefrom a Doppler delay function corresponding to the motion of the receiver, in correcting the auto-correlation function of the GNSS navigation signal received from each satellite of the constellation by means of the delay function, in comparing the corrected auto-correlation function with a theoretical auto-correlation function by applying a quadratic criterion corresponding to the confidence indicator.

8 Claims, 3 Drawing Sheets

(51) Int. Cl.
    *G01S 19/49*     (2010.01)
    *G01S 19/50*     (2010.01)

(56) References Cited

U.S. PATENT DOCUMENTS

| | | | |
|---|---|---|---|
| 2006/0234699 A1 | 10/2006 | Franckart et al. | |
| 2010/0332125 A1* | 12/2010 | Tan | G01C 21/165 |
| | | | 701/408 |
| 2012/0215594 A1* | 8/2012 | Gravelle | G07B 15/063 |
| | | | 705/13 |

OTHER PUBLICATIONS

Doppler effect. (2016). The Columbia Encyclopedia. New York, NY: Columbia University Press. Retrieved from http://search.credoreference.com/content/entry/columency/doppler_effect/0.*

* cited by examiner

METHOD FOR DETERMINING A CONFIDENCE INDICATOR RELATING TO THE TRAJECTORY FOLLOWED BY A MOVING OBJECT

CROSS-REFERENCE TO RELATED APPLICATION

This application claims priority to foreign French patent application No. FR 1200397, filed on Feb. 10, 2012, the disclosure of which is incorporated by reference in its entirety.

FIELD OF THE INVENTION

The present invention relates to a method for determining a confidence indicator relating to the trajectory of a moving object. The invention applies to any satellite positioning system using receivers of GNSS (Global Navigation Satellite System) type such as GPS (Global Positioning System) or Galileo receivers.

BACKGROUND

In a satellite positioning system using a receiver of the GNSS type placed aboard a moving object, the data signals allowing the receiver to calculate its positioning originate from various satellites belonging to a constellation of satellites. The constellation comprises at least four satellites for determining four unknowns corresponding to the geographical x, y, z and temporal t coordinates of the receiver. The positioning of the moving object by the receiver is carried out in two steps. In a first step, the receiver effects the acquisition of radioelectric signals constituting navigation signals originating from the four satellites of the constellation and in a second step, the receiver evaluates the distances separating the moving object from the four satellites whose signals have been received and determines the position of the moving object by using a triangulation method.

An error made in the position of a moving object can have disastrous consequences in an application relating to civil aviation or geo-located road tolls.

There exist numerous sources of positioning error that may impair the validity of the position information determined by a satellite positioning system. A positioning error may be due to a technical problem with the reception of the GNSS signals, such as for example a failure of the receiver or a failure of the information transmitted by the constellation of satellites used. The reliability of the position determined by a satellite positioning system also depends on the environment in which the moving object is situated.

In the case of an aeronautical application relating to civil aviation, the receiver is not constrained by any obstacle, so that the radioelectric signals are received directly from the satellites, without reflection on any wall. In this case, there exist SBAS systems (Satellite-Based Augmentation Systems) making it possible to provide a confidence information item relating to the position calculated by the receiver of an aeronautical moving object. The SBAS systems monitor and bound, permanently, the errors made in the orbit of the satellites, in the synchronization of each satellite with the time reference of the constellations and the errors induced by the propagation of the radioelectric signals in the upper atmosphere and in particular in the ionosphere. The information provided by an SBAS system allows the receiver of the aeronautical moving object to provide the position of the moving object as well as a position error bound.

Geo-located road toll applications consist in determining the road followed by a terrestrial moving object furnished with a GNSS receiver and in billing a user of the terrestrial moving object when the road followed is subject to a toll. Billing being dependent on the road used, the receiver must deliver two complementary information items relating on the one hand, to the position of the moving object and on the other hand, to the trajectory of the moving object. These information items giving rise to billing, it is also necessary to determine a confidence information item relating to the trajectory used.

However, in the case of an application relating to geo-located road tolls, the conditions of reception of the radioelectric signals are much more complex, and much less controlled than in the case of an aeronautical application. It is then much more difficult to bound the position error determined by the receiver.

In an urban setting, the navigation signals emitted by one or by two or three of the satellites of the constellation may for example be stopped by buildings and not arrive at the receiver of the moving object. In this case, the geometry of the set of satellites that are used to calculate the position of the moving object is affected and this may render the calculation of the position of the moving object impossible.

Likewise, in an unfavorable terrestrial setting, the navigation signals emitted by a satellite of the constellation may be reflected on certain walls before reaching the receiver. This phenomenon, called multi-path, has a significant impact on the precision of the position calculated by the receiver. Indeed, the route measured by the receiver is then longer than the distance separating the moving object from the corresponding satellite. This results in an error in the triangulation method and therefore in the position of the moving object. In this case the consequence is twofold since on the one hand, the position error is significant and on the other hand, the receiver has no means of knowing that it has made an error, nor of evaluating the error made. Now, the errors made by the receiver may induce an error of judgment as regards the road followed and consequently induce a false billing. It is therefore necessary to obtain a confidence indicator relating to the trajectory of the moving object determined by the receiver.

SUMMARY OF THE INVENTION

The aim of the invention is to solve these problems and to propose a method for determining a confidence indicator relating to the trajectory followed by a moving object making it possible to evaluate an error in the estimation of the position of the moving object made by a GNSS receiver situated aboard the moving object.

Accordingly, the invention relates to a method for determining a confidence indicator relating to the trajectory of a moving object of a moving object equipped with a receiver able to estimate the position of the moving object on the basis of the reception of navigation signals emitted by a constellation of satellites, the navigation signals being modulated by a code and the receiver comprising a local replica of the code, wherein the method comprises the following steps:

a. Estimating the successive positions of the receiver at various instants of position measurement,
b. Identifying a trajectory segment R1 passing in proximity to the successive estimated positions,
c. Determining the successive auto-correlation functions between the navigation signals received and the local replica of the code, d. Making an assumption about the speed of displacement of the receiver over the identified trajectory segment R1, e. Deducing from the assumption about the speed of displacement of the receiver, a Doppler delay function corresponding to the motion of the receiver, f. Applying the Doppler delay function to each auto-correlation function determined in step c and deducing therefrom corrected auto-correlation functions, g. Summing the corrected auto-correlation functions, the result of the summation corresponding to the corrected auto-correlation function $\hat{R}(\tau)$ of the navigation signal, h. Comparing the result of the summation of the corrected auto-correlation functions $\hat{R}(\tau)$ with a theoretical auto-correlation function $R_{Theo}(\tau)$ and deducing therefrom a confidence indicator that the trajectory segment identified corresponds to the real trajectory followed by the moving object equipped with the receiver.

Advantageously, the confidence indicator is a quadratic criterion $\|\hat{R}(\tau) - R_{Theo}(\tau)\|^2$ corresponding to the squared norm of the difference between the result of the summation of the corrected auto-correlation functions and the theoretical auto-correlation function.

Optionally, the method can comprise an additional step consisting in making several different assumptions about the speed of displacement of the receiver, in determining a confidence indicator corresponding to each speed assumption, and in selecting the speed assumption having the highest confidence indicator.

Alternatively, the speed of displacement of the receiver can be measured by an inertial sensor.

Advantageously, the confidence indicator is determined for each satellite of the constellation.

BRIEF DESCRIPTION OF THE DRAWINGS

Other particular features and advantages of the invention will be clearly apparent in the subsequent description given by way of purely illustrative and nonlimiting example, with reference to the appended schematic drawings which represent.

DETAILED DESCRIPTION

Figure 1:
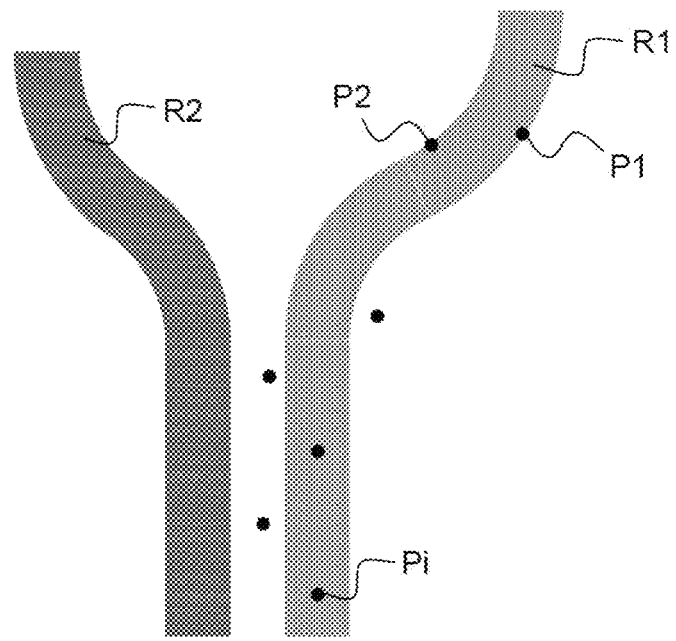
FIG. 1: a diagram of an exemplary typical road system, according to the invention.

FIG. 1 represents a diagram of an exemplary typical road system comprising two possible roads R1, R2. Road R1 is a paying road, road R2 is non-paying. Several moving objects equipped with a GNSS receiver travel on the paying road R1. The positions P1 to Pi of the various moving objects, where i is an integer number greater than 1, determined by the GNSS receivers of each moving object, are marred by errors. The errors made may induce an error of judgment as regards the road followed and consequently a false bill.

Figure 2:
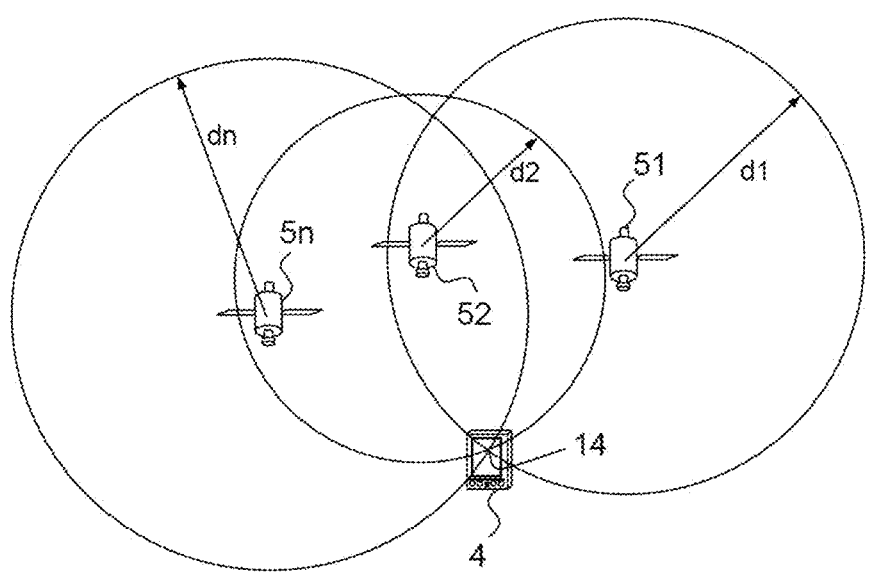
FIG. 2: An example illustrating the determination of the position of a moving object equipped with a GNSS receiver, according to the invention.

An exemplary determination of the position of a moving object equipped with a GNSS receiver 4 is represented schematically in FIG. 2. The receiver 4 determines the distances d1, d2, ..., dn, where n is an integer number greater than or equal to four, separating it from at least four satellites 51, 52, ..., 5n of the constellation, only three satellites are represented in FIG. 2, and then deduces therefrom the point of intersection 14 of at least four spheres, centered respectively on the four satellites and having a circumference passing through the receiver 4, each sphere having a center demarcated by the position of a satellite 51 to 5n of the constellation and having a radius corresponding to one of the distances d1 to dn. The position of the GNSS receiver 4, therefore of the moving object equipped with this receiver 4, corresponds to this point of intersection 14. The measurement of the distances d1 to dn is carried out in the receiver 4 by logging the arrival time of radioelectric signals constituting a navigation message originating from the satellites 51 to 5n. The radioelectric signals emitted by each satellite consist of information items necessary for the calculation of the position of the receiver, these information items being modulated by a code which may for example be a periodic pseudo-random spreading code. The bitrate of the information items is slower than the bitrate of the code. By way of example, in the case of a GPS signal, a spreading code possesses a period of 1 ms and a bitrate of 1023 bits per second whereas the bitrate of the information items is 50 bits per second. The whole of data added modulo 2 to the spreading code is transmitted on a carrier. Typically, in the case of a GPS signal, the carrier is equal to 1.57542 GHz. The essential information items originating from each satellite via the navigation message and that must be processed by the receiver 4 consist of the time of emission of the message and the position of the satellite at the instant of the emission of the radioelectric signal. Other information items are also transmitted by the satellite, such as certain corrections to be made to the onboard clock of the satellite, parameters of corrections of speed of propagation of the signals in the layers of the terrestrial atmosphere and the approximate positions of the other satellites of the constellation via data termed almanacs. The satellite transmits in its navigation message its ephemerides (Keplerian parameters) allowing the receiver 4 to calculate the position of the satellite in a reference datum tied to the Earth. In the case of a GPS signal the ephemerides consist of 16 parameters repeated every 30 seconds in the navigation message.

The position of the satellite having been obtained, it remains for the receiver 4 to detect the time of emission of the message so as to deduce the propagation time of the signal emitted by the corresponding satellite, the distance separating it from said satellite and the radius of the corresponding sphere. The time of emission of the message is included in the navigation message broadcast by the satellite and, in the case of a GPS system, is repeated every six seconds. However it is appropriate to apply a satellite clock correction to the time read from the navigation message so as to refer the time transmitted to a reference system common to all the satellites. This correction is transmitted every thirty seconds.

When the time of emission of the message is decoded and corrected, the receiver deduces the propagation time of the radioelectric signal by differencing between the time of reception and the time of emission of the navigation message. This information item, corrected of the errors of speed of propagation of the signals in the various layers of the terrestrial atmosphere such as the ionosphere, provides the receiver with an estimation of the distance separating it from the satellite. By using the signals originating from at least four satellites 51 to 5n of the constellation, the receiver 4 deduces therefrom its position, and therefore that of the moving object in which it is situated, by means of a known triangulation method.

The determination of the time of reception of the GNSS signal, as with any spread spectrum signal, is performed by calculating the auto-correlation function between the signal received and a local replica of the spreading code corresponding to the satellite sought. In the case of a GPS signal, the auto-correlation function is a triangle-shaped function wherein the temporal position of the top indicates the instant of reception of the signal. This instant of reception is then used in the triangulation method.

Figure 3A:
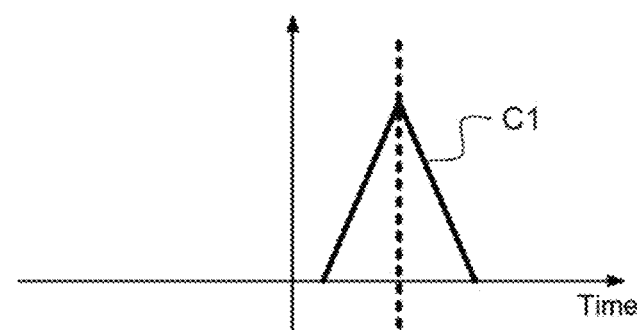
FIGS. 3a, 3b, 3c: three diagrams illustrating an exemplary evolution of an auto-correlation function of a GPS signal, according to the invention.
Figure 3B:
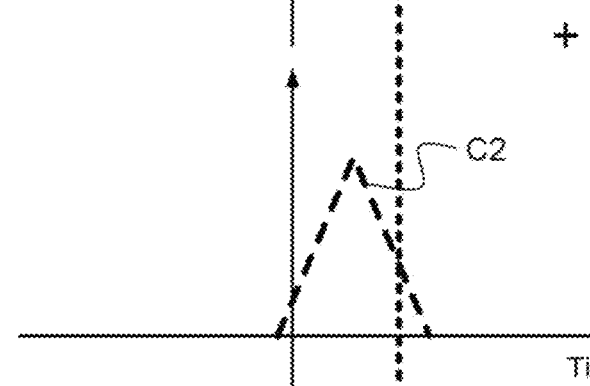

The auto-correlation function of a GPS signal is schematically represented in FIGS. 3a and 3b for two successive instants t1 and t2. As shown by these two figures, the auto-correlation functions C1 and C2 of the GPS signal calculated at an instant t1 and at an instant t2 greater than the instant t1, are displaced, as indicated in FIG. 3b, to another temporal position. The position of the correlation peak varies over time because of the relative motion of the satellite with respect to the receiver 4 of the moving object and therefore of the evolution of the distance between the satellite and the receiver 4. This phenomenon known by the name of Doppler effect on the spreading code is due to three different causes which are the motion of the satellite, the motion of the receiver and to a lesser extent, the receiver clock errors.

The motion of the satellite with respect to the receiver, considered stationary, can be compensated, so that this motion no longer has any impact on the displacement of the auto-correlation peak. The speed of displacement of the correlation peak, due to the displacement of the satellite, is expressed in the form $$\frac{V_r}{c}$$

where Vr is the radial speed of the satellite with respect to the receiver 4 and c is the speed of light.

The radial speed Vr of the satellite is calculated on the basis of the distance separating the satellite from the receiver 4 by using the ephemerides transmitted by the satellite. The distance d(t) between the satellite and the receiver at an instant t is deduced directly by the calculation of the norm of the vector linking the position of the satellite to the position of the receiver. The same calculation operated at a subsequent instant t+δt makes it possible to evaluate the distance between the satellite and the receiver at the instant t+δt, that is to say d(t+δt). The radial speed is then expressed in the form $$V_r = \frac{d(t + \delta t) - d(t)}{\delta t}.$$

For this calculation a must be chosen small, for example of the order of a second. In the case of a GPS system, the spreading code lasting 1 ms, the receiver 4 undertakes the calculation of the auto-correlation function every millisecond. Each millisecond, the position of the correlation peak thus moves by the temporal quantity $$\delta \tau = 10^{-3} \times \frac{V_r}{c}.$$

If $R_k(\tau)$ represents the auto-correlation function calculated at the instant τ after the kth millisecond, where k is an integer number greater than 1 and where τ corresponds to an estimation of the signal arrival time, the compensation of the motion of the satellite is carried out by applying a delay to this auto-correlation function, the delay being equal to $$k * 10^{-3} \frac{V_r}{c},$$

so as to maintain the correlation peak at the initial position.

To facilitate the process for estimating the position of the auto-correlation peak R(τ), this estimation is performed on the basis of an incoherent sum of a succession of N auto-correlation functions, where N is the number of position measurements carried out for the total duration of measurement.

$$R(\tau) = \sum_{k=1}^{N} R_k(\tau)$$

Figure 3C:
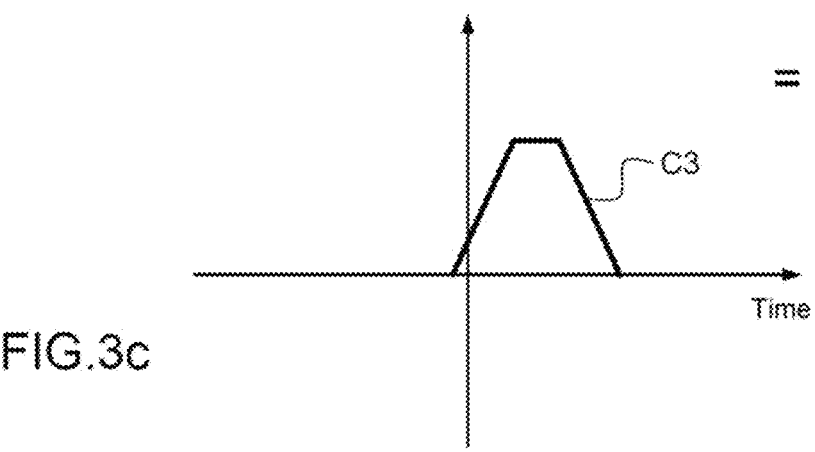

When the Doppler effect is not compensated, the auto-correlation function does not exhibit a peak but a flattened top, as shown by the result C3 of the summation of the auto-correlation functions C1+C2, represented in FIG. 3c. This effect has a very deleterious impact on the estimation of the GPS signal arrival time.

To remedy this problem and correct the Doppler effect due to the motion of the satellite, it is therefore appropriate to apply, to each calculated auto-correlation function, the delay of $$k * 10^{-3} \frac{V_r}{c}$$

indicated hereinabove, and therefore to calculate the following quantity:

$$\tilde{R}(\tau) = \sum_{k=1}^{N} R_k\left(\tau - k \times \frac{V_r}{c} \times 10^{-3}\right)$$

This operation then makes it possible to compensate the Doppler effect due to the motion of the satellite and to retrieve, for a stationary receiver, a triangle-shaped correlation peak.

The Doppler effect due to the displacement of the receiver 4 cannot generally be compensated and is therefore suffered. This Doppler effect applies to the receiver spreading code which is shifted with respect to the satellite spreading code, this being manifested by a deformation of the correlation peak as in the case relating to the error due to the motion of the satellite. To limit the error induced by this Doppler effect, the duration of summation of the auto-correlation functions is limited so as to limit the deformation of the correlation peak.

To correct the Doppler effect due to the displacement of the receiver 4, it would indeed be appropriate to operate the following summation:

$$\hat{R}(\tau) = \sum_{k=1}^{N} R_k(f(\tau))$$

where $f(\tau)$ is a function which depends on the motion of the receiver 4 although this motion of the receiver is unknown.

If P(t) denotes the true position of the receiver at an instant t, and $X_s(t)$ the position of the satellite at the instant t, then the relative radial speed between the satellite and the receiver may be expressed as $$V_r = \frac{d(\|P(t) - X_s(t)\|)}{dt},$$

and the function $f(\tau)$ is determined by the following relation:

$$f(\tau) = \tau - k \times \frac{1}{c} \frac{d(\|P(t) - X_S(t)\|)}{dt} \times 10^{-3}$$

To determine a confidence indicator relating to the trajectory estimated by the GNSS receiver 4 and therefore relating to the road followed by a moving object equipped with the receiver 4, the method according to the invention then consists, on the basis of the signals emitted by the satellite constellation, in estimating the positions of the receiver at various successive instants according to a triangulation method as indicated hereinabove, and then on the basis of the estimated positions, in making an assumption about the trajectory followed by the moving object equipped with the receiver 4, the trajectory assumption consisting of a selection of a road segment passing in proximity to the various estimated positions, the selected road segment being able for example to be a toll road R1 subject to billing or a toll-free road R2. To make the trajectory assumption, the receiver 4 comprises mapping means allowing it to ascertain the road topology in the vicinity of the estimated positions. The receiver 4 thereafter makes an assumption about a speed of displacement of the receiver on the selected road segment, and deduces therefrom a journey time T for said selected road segment, $$T = \frac{L}{V}$$

where V represents said speed of the receiver and L the length of said road segment. The receiver 4 deduces therefrom the function $f(\tau)$ by using the equation $$f(\tau) = \tau - k \times \frac{1}{c} \frac{d(\|P(t) - X_S(t)\|)}{dt} \times 10^{-3}$$

and, by using the equation, $$\hat{R}(\tau) = \sum_{k=1}^{N} R_k(f(\tau))$$

calculates the function $\hat{R}(\tau)$ corresponding to the auto-correlation function employing the assumptions made, for the navigation signal, for example GPS, after correcting the Doppler effect due to the displacement of the receiver 4 over the road segment, by summing the auto-correlation functions obtained at each instant of position measurement $\tau$, along the entire selected trajectory, that is to say by taking $$N = \frac{T}{10^{-3}}$$

in the case of GPS. The receiver thereafter calculates a confidence indicator corresponding to a likelihood index that the corrected auto-correlation function $\hat{R}(\tau)$ is triangle-shaped and corresponds to a theoretical auto-correlation function $R_{Theo}(\tau)$. The confidence indicator can be expressed in the form of a quadratic criterion such as for example $\|\hat{R}(\tau) - R_{Theo}(\tau)\|^2$. This confidence indicator must be determined for each satellite of the constellation.

For the same trajectory assumption, the receiver can successively emit several different speed assumptions and for each speed assumption, determine a corresponding value of the confidence indicator, the receiver retaining only the speed assumption corresponding to the highest confidence indicator.

Figure 4:
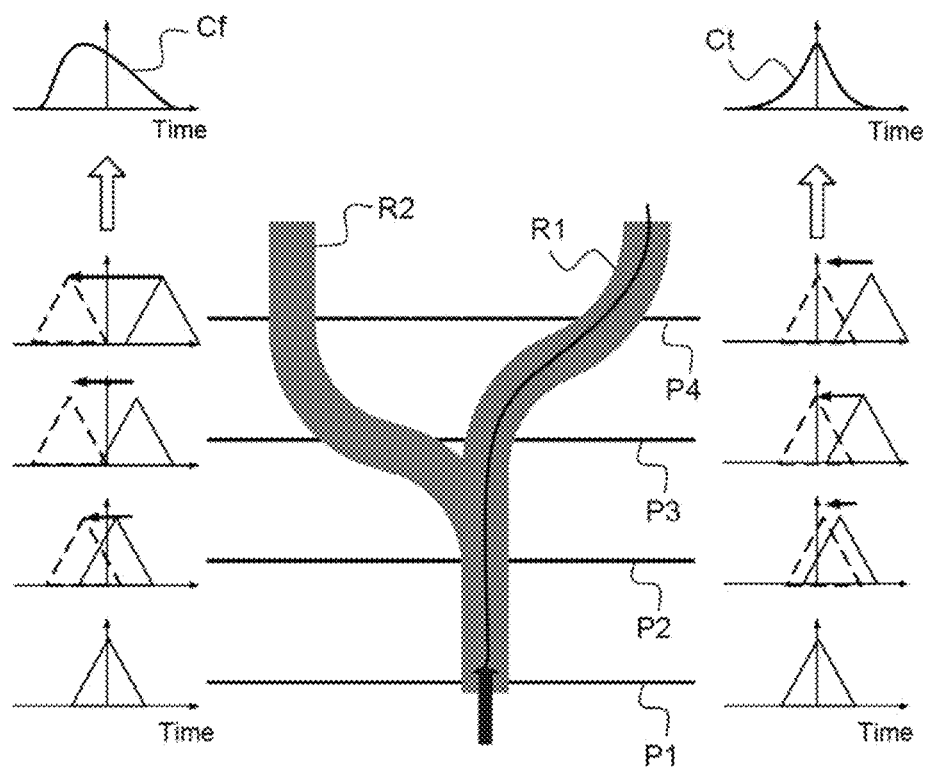
FIG. 4: a diagram illustrating the method for determining a confidence indicator relating to the trajectory of a moving object, according to the invention.

FIG. 4 illustrates the effect of the correction of the Doppler effect due to the motion of the receiver in the case where the trajectory assumption is the real trajectory followed by the moving object equipped with the receiver 4 and in the case where the trajectory does not correspond to the real trajectory. The road segment R1 forms the subject of a billing and corresponds to the road followed by a mobile user, whereas the road segment R2 does not form the subject of billing. For the two assumptions and for various successive measurement instants corresponding to four different positions P1, P2, P3, P4 of the moving object on the corresponding road segments, the auto-correlation functions before correction of the Doppler effect are represented by solid lines and the auto-correlation functions after correction are represented by dashed lines. The horizontal arrows represent the temporal displacement of the various auto-correlation functions after correction.

The receiver compares the likelihood of having followed the road segment R1 with respect to the road segment R2. This FIG. 4 shows that in the case where the receiver makes the assumption of having followed the road segment R1 which corresponds to the real trajectory of the moving object, the resulting auto-correlation function Ct, after correction, of the Doppler effect on the receiver spreading code, corresponds to a function strongly resembling the triangle-shaped theoretical auto-correlation function. In the case where the receiver makes the assumption of having followed the road segment R2 which does not correspond to the real trajectory of the moving object, the resulting auto-correlation function Cf, after correction of the Doppler effect on the receiver spreading code, is very far removed from the triangle-shaped theoretical auto-correlation function.

Alternatively, for one and the same selected trajectory assumption, instead of making assumptions about the speed of displacement of the receiver, the receiver can be equipped with an inertial sensor, allowing it to estimate its relative displacements and consequently its speed of displacement over a corresponding road segment of the trajectory. In this case, the function $f(\tau)$ is obtained through the relation $$f(\tau) = \tau - \frac{V_r + V_l}{c} * 10^{-3} * k$$

where $V_l$ is the radial speed estimated by the inertial sensor. The method then comprises the various steps indicated hereinabove, with the exception of the speed of the receiver which is no longer an assumption but an estimation formulated by an inertial sensor.

Finally, the method according to the invention can comprise an extra step consisting in making an additional assumption relating to the drift of the local clock of the receiver. This additional assumption consists in modulating the relative radial speed between the receiver and the satellite.

Although the invention has been described in conjunction with particular embodiments, it is very obvious that it is in no way limited thereto and that it comprises all the technical equivalents of the means described as well as their combinations if the latter enter within the framework of the invention.

The invention claimed is:

1. A method for determining a confidence indicator relating to a trajectory of a moving object equipped with a GNSS receiver able to estimate a position of the moving object on a basis of a reception of navigation signals emitted by a constellation of satellites, the navigation signals being modulated by a code and the GNSS receiver comprising a local replica of the code, said method comprising the following steps:
   a. estimating with the GNSS receiver successive positions of the GNSS receiver at various instants of position measurement,
   b. identifying with the GNSS receiver a trajectory segment passing in proximity to the successive estimated positions,
   c. determining with the GNSS receiver successive auto-correlation functions between the navigation signals received and the local replica of the code,
   d. making an assumption with the GNSS receiver about a speed of displacement of the GNSS receiver over the identified trajectory segment,
   e. deducing with the GNSS receiver from the assumption about the speed of displacement of the GNSS receiver, a Doppler delay function corresponding to a motion of the GNSS receiver,
   f. applying with the GNSS receiver the Doppler delay function to each auto-correlation function determined in step c and deducing therefrom corrected auto-correlation functions,
   g. summing with the GNSS receiver the corrected auto-correlation functions, a result of the summation corresponding to the corrected auto-correlation function $\hat{R}(\tau)$ of the navigation signal, and
   h. comparing with the GNSS receiver the result of the summation of the corrected auto-correlation functions $\hat{R}(\tau)$ with a theoretical auto-correlation function $R_{Theo}(\tau)$ and deducing therefrom a confidence indicator that the trajectory segment identified corresponds to a real trajectory followed by the moving object equipped with the GNSS receiver.

2. The method according to claim 1, wherein the confidence indicator is a quadratic criterion $\|\hat{R}(\tau) - R_{Theo}(\tau)\|^2$ corresponding to a squared norm of a difference between the result of the summation of the corrected auto-correlation functions and the theoretical auto-correlation function.

3. The method according to claim 1, further comprising making several different assumptions about the speed of displacement of the GNSS receiver, determining a confidence indicator corresponding to each speed assumption, and selecting the speed assumption having the highest confidence indicator.

4. The method according to claim 1, wherein the confidence indicator is determined for each satellite of the constellation.

5. A method for determining a confidence indicator relating to a trajectory of a moving object equipped with a GNSS receiver able to estimate a position of the moving object on a basis of a reception of navigation signals emitted by a constellation of satellites, the navigation signals being modulated by a code and the GNSS receiver comprising a local replica of the code, said method comprising the following steps:
   a. estimating with the GNSS receiver successive positions of the GNSS receiver at various instants of position measurement,
   b. identifying with the GNSS receiver a trajectory segment passing in proximity to the successive estimated positions,
   c. determining with the GNSS receiver successive auto-correlation functions between the navigation signals received and the local replica of the code,
   d. measuring with the GNSS receiver a speed of displacement of the GNSS receiver over the identified trajectory segment,
   e. deducing with the GNSS receiver from the measured speed of displacement of the GNSS receiver, a Doppler delay function corresponding to a motion of the receiver,
   f. applying with the GNSS receiver the Doppler delay function to each auto-correlation function determined in step c and deducing therefrom corrected auto-correlation functions,
   g. summing with the GNSS receiver the corrected auto-correlation functions, a result of the summation corresponding to the corrected auto-correlation function $\hat{R}(\tau)$ of the navigation signal, and
   h. comparing with the GNSS receiver the result of the summation of the corrected auto-correlation functions $\hat{R}(\tau)$ with a theoretical auto-correlation function $R_{Theo}(\tau)$ and deducing therefrom a confidence indicator that the trajectory segment identified corresponds to a real trajectory followed by the moving object equipped with the GNSS receiver.

6. The method according to claim 5, wherein the confidence indicator is a quadratic criterion $\|\hat{R}(\tau) - R_{Theo}(\tau)\|^2$ corresponding to a squared norm of a difference between the result of the summation of the corrected auto-correlation functions and the theoretical auto-correlation function.

7. The method according to claim 5, wherein the speed of displacement of the GNSS receiver is measured by an inertial sensor.

8. The method according to claim 5, wherein the confidence indicator is determined for each satellite of the constellation.

* * * * *